Oct. 20, 1959     J. W. COLTON     2,909,240
CHLORINE RECOVERY
Filed July 31, 1957
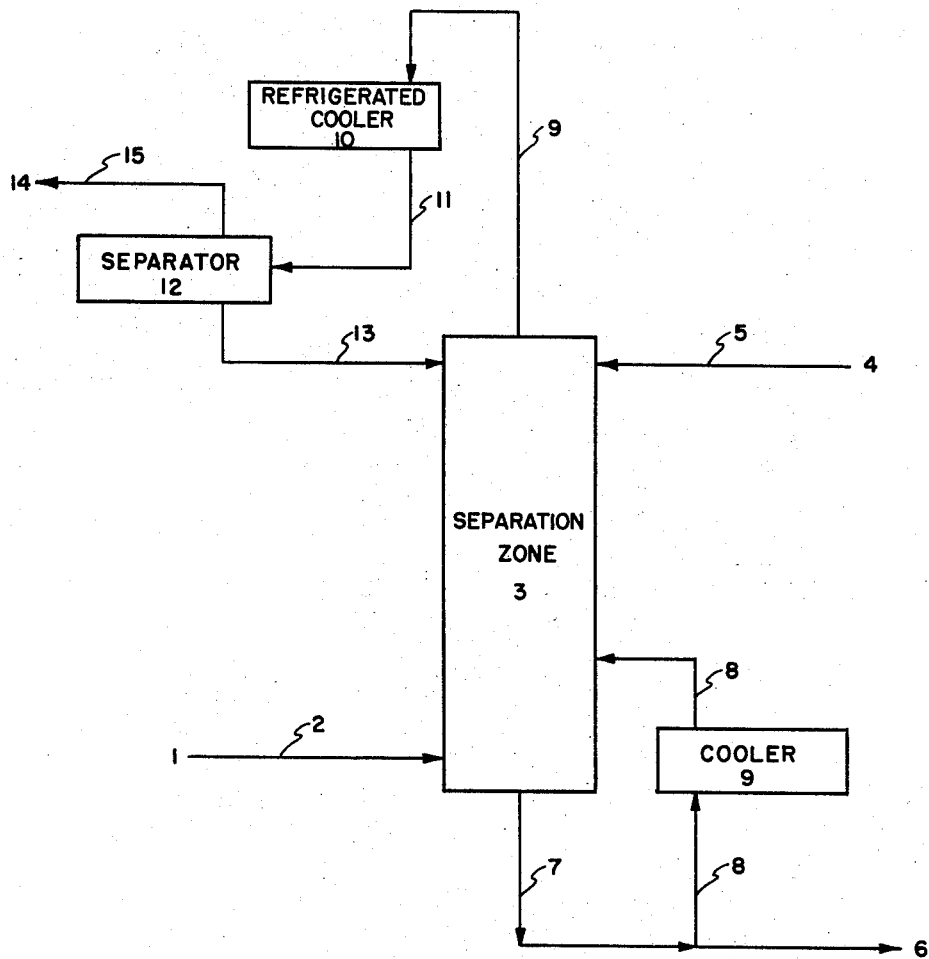
INVENTOR.
John W. Colton
BY
ATTORNEY

United States Patent Office 2,909,240
Patented Oct. 20, 1959

2,909,240

CHLORINE RECOVERY

John White Colton, Pelham Manor, N.Y., assignor, by mesne assignments, to Scientific Design Company, Inc., a corporation of Delaware Application July 31, 1957, Serial No. 675,423

5 Claims. (Cl. 183—115)

This invention relates to the recovery of chlorine from a hydrogen chloride stream containing chlorine. More particularly, this invention relates to a process wherein a hydrogen chloride stream containing chlorine is washed with an aqueous azeotropic solution of hydrochloric acid to remove hydrogen chloride and separating therefrom residual aqueous hydrochloric acid. The dry chlorine stream is recovered.

This invention has particular applicability to reactor effluent streams containing hydrogen chloride and chlorine obtained in the course of thermal chlorination of aliphatic hydrocarbons where it is economically feasible and desirable to recover dry chlorine and recycle to the chlorinator.

It is the object of the present invention to provide a process for the recovery of dry chlorine from a hydrogen chloride stream wherein substantial savings are realized in both capital and operating costs.

In a preferred embodiment the invention comprises a process for the recovery of chlorine from a hydrogen chloride stream containing chlorine which comprises the combination of scrubbing said hydrogen chloride stream containing chlorine with a hydrogen chloride solution of at least azeotropic concentration and cooling the gaseous effluent to below about 0° C. to separate hydrogen chloride and chlorine.

The following detailed description taken in conjunction with the accompanying drawing will show that the chlorine recovery art has been technically advanced according to the process of this invention.

Figure 1 is a diagrammatic illustration of one embodiment of the process of the instant invention.

Referring now to the drawing in detail a chlorine containing hydrogen chloride stream 1 is fed through line 2 to a separation column 3 maintained at a temperature between about 40 and 50° C. A hydrochloric acid solution 4 of at least azeotropic concentration is fed through line 5 to the separation column. An aqueous hydrochloric acid liquid effluent 6 is removed through line 7 and a portion of this stream may be recycled through line 8 and a cooler 9 to the separation column.

A vapor effluent is passed through line 9 to a refrigerated cooler 10 and then through line 11 to a refrigerated separator 12. The condensate is returned through line 13 to the separation column. The dry chlorine vapor is removed through line 15 and may be fed to a chlorinator.

The hydrogen chloride stream contains chlorine and chlorocarbons such as carbon tetrachloride and perchlorethylene. This stream may be fed to the scrubbing column where it is contacted with a scrubbing medium (desirably in a countercurrent manner) an aqueous hydrochloric acid solution of at least azeotropic concentration, at any temperature between that of the reactor effluent and room temperature, although it is preferred to maintain the temperature between about 25 and 50° C. When operating with higher temperatures, such as that of the reactor effluent which may approximate 500 to 600° C., the reactor effluent is abruptly quenched in a suitable inert medium or the volume of scrubbing medium may be increased to maintain the temperature of the scrubber between about 25 to 50° C. The concentration is at least that of an azeotropic mixture at the particular operating temperature in order that the hydrogen chloride concentration in the vapor effluent will permit refrigeration to below about 0° C. and preferably to as low as −15° C. which permits the removal of substantially all of the water in the vapor effluent without freezing of the condensate, thus providing dry chlorine.

The liquid effluent of aqueous hydrochloric acid removed from the scrubber may be discarded, stripped to obtain anhydrous hydrogen chloride or it may be partially fed back to the column at a point intermediate between the hydrogen chloride feed line and the feed point of the hydrochloric acid azeotrope mixture.

The vapor effluent can be refrigerated with brine or other conventional media and the condensate containing aqueous hydrochloric acid and some chlorocarbons, such as carbon tetrachloride, is separated from the dry chlorine stream and may be returned to the scrubbing column.

It has been found as a feature of this invention that solid hydrates of chlorine do not form in the presence of hydrogen chloride vapor even at temperatures as low as −15° C. Thus, this and the presence of hydrogen chloride in the wet chlorine vapor leaving the scrubber permit refrigeration of the vapor to temperatures much lower than 0° C. without solidification of the condensate or plugging of the system which would necessitate shutdown, wherein substantial savings are realized in both capital and operating costs.

The following example is illustrative of the present invention but is not to be construed as limitative thereof.

A vapor stream, incidental to the manufacture of perchloroethylene by thermal chlorination, containing predominantly hydrogen chloride and contaminated by chlorine and carbon tetrachloride is fed to a scrubbing zone wherein it is countercurrently scrubbed with aqueous hydrochloric acid solution of at least azeotropic concentration. This scrubbing step removes the major part of the hydrogen chloride, the majority of the carbon tetrachloride and minor amounts of chlorine. The vapor effluent from the scrubbing zone is comprised of chlorine and carbon tetrachloride and minor amounts of hydrogen chloride and water. This vapor effluent is passed through a refrigerated cooler maintained at approximately −15° C. by means of brine and hence to a vapor-liquid separator maintained at −15° C. and approximately 800 mm. Hg. The refrigerated cooler and separator produces chlorine containing minimal amounts of carbon tetrachloride which is substantially free of hydrogen chloride and water. This chlorine stream is adapted to be used in a thermal chlorinator for the production of perchlorethylene. The tetrachloride, water and hydrogen chloride are returned to the scrubbing zone.

As illustrated by the foregoing example, it is a feature of the present invention that, by utilizing an aqueous hydrochloric acid scrubbing medium of at least azeotropic concentration or greater, there is produced an effluent stream containing hydrogen chloride and water. This enables cooling of the effluent stream to such temperature as to produce chlorine substantially free of water, while avoiding such operational difficulties as the formation of a solid condensate.

While the foregoing example illustrates cooling the chlorine stream containing hydrogen chloride and water to a temperature of −15° C., it will be realized that desirable results are obtained by cooling the stream to a temperature below about 0° C. in order to effect separation of hydrogen chloride and water from the chlorine stream. Similarly, it will be realized that the lower the temperature to which the chlorine stream is cooled the more complete will be the removal of the hydrogen chloride and water. In general, it is not desirable to cool the gas stream to a temperature below approximately −20° C.

Similarly, while the cooler and separator were maintained at 800 mm. Hg it will be realized that the pressure can be varied to any desired pressure. Preferably, the pressure in the cooler and separator is less than that at which the separation zone is maintained.

In view of the foregoing disclosures, variations and modifications thereof it will be apparent to one skilled in the art and it is intended to include within the invention all such variations and modifications except as do not come within the scope of the appended claims.

What is claimed is:

1. A process for the recovery of chlorine from a chlorine-containing hydrogen chloride stream comprising contacting said chlorine-containing hydrogen chloride stream with an aqueous hydrochloric acid solution of at least azeotropic concentration and cooling the resulting gaseous effluent to below about 0° C. and separating the chlorine as a resulting gaseous stream and the condensate as a liquid stream.

2. A process of claim 1 in which the resulting gaseous effluent is cooled to a temperature in the range of about −20° C. to 0° C.

3. In a process of claim 1 the further step of returning the aqueous hydrogen chloride condensate produced to the contacting step.

4. In a process for the recovery of chlorine from a hydrogen chloride stream containing chlorine, the combination of scrubbing said hydrogen chloride stream containing chlorine with an aqueous hydrochloric acid solution of at least azeotrope concentration, removing the liquid effluent of aqueous hydrochloric acid, separating organic and aqueous phases of said liquid effluent and returning a portion of the aqueous phase after cooling to the scrubbing column, cooling the gaseous effluent of the scrubbing column to below about 0° C. to separate hydrogen chloride and water from chlorine, and recovering said chlorine.

5. The process of claim 4 wherein the gaseous effluent is cooled to a temperature between about 0° and −20° C. to separate hydrogen choride and water as condensate and returning said condensate to the scrubbing zone.

References Cited in the file of this patent

UNITED STATES PATENTS

| | | |
|---|---|---|
| 2,730,194 | Wohlers et al. | Jan. 10, 1956 |
| 2,746,998 | Brown et al. | May 22, 1956 |
| 2,750,002 | Hooker et al. | June 12, 1956 |

OTHER REFERENCES

"General College Chemistry," by Babor and Lehrman, 1946, T. Y. Crowell Co., New York, 2nd edition, pages 314, 320.